(12) United States Patent
Gall et al.

(10) Patent No.: US 6,931,934 B2
(45) Date of Patent: Aug. 23, 2005

(54) SENSOR TOP HAT COVER APPARATUS AND METHOD

(75) Inventors: Kenneth E. Gall, Rock City, IL (US); James D. Cook, Freeport, IL (US); Brian J. Marsh, Freeport, IL (US); Richard L. Dale, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/660,175

(22) Filed: Sep. 10, 2003

(65) Prior Publication Data

US 2005/0050955 A1 Mar. 10, 2005

(51) Int. Cl.$^7$ ................................................. G01I 7/08
(52) U.S. Cl. ......................................................... 73/715
(58) Field of Search .......................... 73/700, 715, 721, 73/727, 729.1

(56) References Cited

U.S. PATENT DOCUMENTS

| | | | |
|---|---|---|---|
| 3,588,395 A * | 6/1971 | Hersey | 200/83 S |
| 4,454,440 A | 6/1984 | Cullen | 310/313 R |
| 4,978,941 A | 12/1990 | Brown | 340/447 |
| 5,821,425 A | 10/1998 | Mariani et al. | 73/703 |
| 5,966,829 A * | 10/1999 | Lia et al. | 33/556 |
| 5,999,082 A * | 12/1999 | Kurtz et al. | 338/42 |
| 6,079,276 A | 6/2000 | Frick et al. | 73/718 |
| 6,218,936 B1 | 4/2001 | Imao | 340/447 |
| 6,259,360 B1 | 7/2001 | Takamura | 340/445 |
| 6,450,021 B1 | 9/2002 | Katou et al. | 73/146.5 |
| 6,484,585 B1 | 11/2002 | Sittler et al. | 73/718 |

* cited by examiner

*Primary Examiner*—William Oen
*Assistant Examiner*—Andre Allen
(74) *Attorney, Agent, or Firm*—Kris T. Fredrick

(57) ABSTRACT

A sensor apparatus and method are disclosed herein, including a sensor element located on a base and a cover located proximate to the base. The cover generally includes a sensor diaphragm and a dimple that can form a part of the cover. A flanged area or flanged portion can also be connected to the bottom portion of the cover. The flanged area provides a surface for contacting a fixture to which the sensor apparatus attaches and holding the sensor apparatus to the fixture in a manner which prevents the sensor diaphragm from contacting the fixture and inducing errors during sensor operations thereof. The cover also can include a flanged or brim-shaped portion which is connected to and surrounds the bottom portion of the cover. The flanged portion can be positioned parallel to the sensor diaphragm.

16 Claims, 7 Drawing Sheets

(Section A-A)

(Section A-A)

(DETAIL C)

SENSOR TOP HAT COVER APPARATUS AND METHOD

TECHNICAL FIELD

The present invention is generally related to sensing methods and systems. The present invention is particularly related to pressure sensors. The present invention is also related to sensor cover and base designs.

BACKGROUND OF THE INVENTION

Various sensors are known in the pressure sensing arts. In particular, many different techniques have been proposed for sensing the pressure in tires and for delivering this information to the operator at a central location on the vehicle so that he knows that a tire is at low or high air pressure.

Such pressure sensors generally communicate with the vehicle so that the sensed pressure is displayed to the operator when the vehicle is moving, i.e. the wheel rotating relative to the body of the vehicle. Such devices are generally relatively complex and expensive or alternatively are not particularly robust.

Some tire pressure sensor systems incorporate a sensor that is fixed to the body so no rotating electrical contact between the rotating wheel and the chassis is required. In this system, a sensor rod is deflected by contact with the tire sidewall when the sidewall of the tire is deformed as occurs when the tire pressure is low. This system provides an indication of low tire pressure but is not robust. For example mud or other debris on the wheels may cause faulty readings. Furthermore, this system provides an indication only when the tire pressure is reduced significantly as is necessary for significant tire bulge to occur. Clearly such a system simply cannot provide a reading of actual tire pressure.

In another form of fixed sensor the height of the vehicle can be detected and when the height is reduced, it is deemed tire pressure is low. However, if the tire in a rut or is parked on uneven ground, a faulty low-pressure reading is likely to be generated.

More complicated systems are capable of monitoring tire pressure. For example, some pressure sensor systems utilize a rotating encoder formed by a multipolar ring of magnetic segments of different polarity that are distributed circumferentially in a regular and alternating manner. A transmitter coil coaxial with the ring and a fixed pickup (an induction coil system) is energized by alternating electrical current flowing through the transmitter coil to generate a magnetic field superimposed on the magnetic field created by the multipolar ring generates a signal picked up and delivers a signal relating the rotating characteristic of the wheel and thus, the state of the tire.

Some tire pressure systems also utilize a wheel system wherein each sensor on each wheel is provided with a radio transmitter that transmit the information on tire pressure, etc. from the wheel to a radio receiver on the body of the vehicle and this transmitted signal is decoded to provide information on tire pressure etc. and makes it available to the operator. Conventional wireless systems, however, are not durable and are expensive to design and produce.

SAW pressure sensors, for example, can be composed of a sense element on a base and pressure transducer sensor diaphragm that is part of the cover. For the SAW sensor to function properly, the sensor diaphragm should be in intimate contact with the sense element at all pressure levels and temperatures. To compensate for expansion in the packaging, the sense element and sensor diaphragm must be preloaded when they are assembled to shift the output frequency a known amount, which ensures contact at all times.

One of the problems encountered in conventional sensor designs is that the sensor itself can be composed of a sense element on a base and pressure transducer sensor diaphragm that is part of the package cover. When attempting to hold the sensor in a fixture to perform a pre-load assembly, static tests or pressure tests, the fixture itself can induce errors in the output by contacting the sensor diaphragm and increasing pressure to the sense element. A need thus exists to prevent such errors in sensors which include base and cover components.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is; therefore, one aspect of the present invention to provide an improved sensor apparatus and method.

It is yet a further aspect of the present invention to provide for an improved sensor package cover design for use in sensor devices.

It is an additional aspect of the present invention to provide a sensor apparatus, which can be utilized as a component of a pressure monitoring system.

The aforementioned aspects of the invention and other objectives and advantages can now be achieved as described herein. A sensor apparatus and method are disclosed herein, including a sensor element located on a base and a cover located proximate to the base. The cover generally includes a sensor diaphragm and a dimple that can form a part of the cover.

A flanged area can also be connected to the bottom portion of the cover. The flanged area provides a surface for contacting a fixture to which the sensor apparatus attaches and holding the sensor apparatus to the fixture in a manner which prevents the sensor diaphragm from contacting the fixture and inducing errors during sensor operations thereof. The flanged area is connected to and surrounds the bottom portion of the cover. The flanged area or flanged portion can be positioned parallel to the sensor diaphragm.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
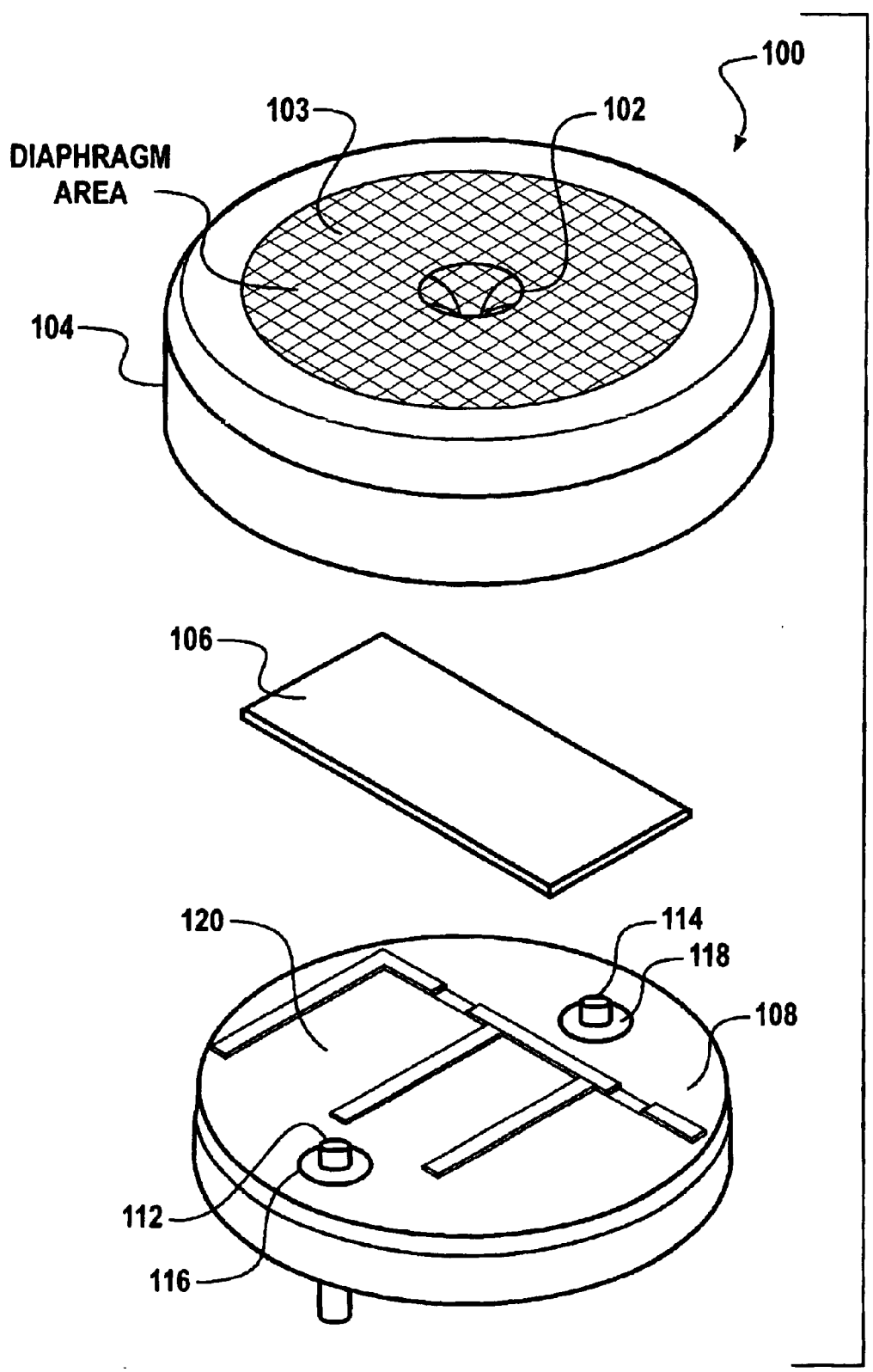
FIG. 1 illustrates an exploded view of a sensor apparatus, which can be implemented in accordance with an embodiment of the present invention.

The particular values and configurations discussed in these non-limiting examples can be varied and are cited merely to illustrate at least one embodiment of the present invention and are not intended to limit the scope of the invention.

The invention described herein can be implemented, in accordance with one possible embodiment, as a product in a component in a wireless pressure monitoring system. Such an embodiment can be configured as a small-size device, which is also lightweight and based on battery-less operation. The pressure sensor described herein does not consume power when implemented in the context of a Tire Pressure Monitoring System (TPMS) operation. Thus, the present invention can be embodied in a practical and low cost design solution. Such a design can be mass-produced for automotive, heavy-duty vehicles, and other commercial markets.

The sensor described herein can be implemented as a pressure sensor that includes a sense element, a package base, and a cover that contains a flexible diaphragm and a dimple. For the sensor to achieve the application accuracy required, the dimple must be in intimate contact with the sense element at all pressure levels and temperatures. To compensate for thermal expansion of the packaging materials (i.e., base and cover), the sense element (e.g., a quartz sense element) and the sensor diaphragm are preferably preloaded when they are assembled, in order to shift the output frequency a known amount to ensure contact at all times.

Note that although the pressure sensor can be implemented as a SAW pressure sensor, it can be appreciated that embodiments of the present invention can be implemented in the context of a non-SAW sensors. For example, rather than utilizing a quartz sense element, other types of sense elements (e.g., ceramic, silicon and the like) may be utilized in accordance with alternative embodiments of the present invention.

A dimple can be formed in the center of the pressure sensor diaphragm portion of the cover during its manufacture. The dimple contacts a flat surface on the quartz sense element. In general, the pressure sensor can be embodied as a small, circular element. The design configuration is generally implemented as small, circular, hermetically sealed button package. Example dimensions include approximately 12 mm in diameter and approximately 2 mm thick. It can be of course be appreciated by those skilled in the art that such dimensions are discussed herein for illustrative purposes only, and are not considered limiting features of the present invention. Pressure sensor dimensions may vary, depending on the needs and use of such a device.

The design of the cover and base are such that it generally allows for the reduction of assembly tolerances. The sensor material of the base and cover can be formed from stainless steel 17-7 PH. The advantages of such a material are discussed in greater detail herein. The pressure sensor can also be configured in association with an interface design board. For example, a PCB or flex circuit interconnect can be located between the pressure sensor button package and one or more antennas thereof for the transmission and receipt of wireless data.

FIG. 1 illustrates an exploded view of a sensor 100, which can be implemented in accordance with an embodiment of the present invention. Sensor 100 generally includes a package cover 104 that includes a dimple 102 formed at the center of diaphragm 103. In FIG. 1, the diaphragm area of diaphragm 103 is indicated generally by a circular dashed line. Similarly, dimple 102 is generally indicated also by a circular dashed line. The diaphragm 103 is the flat surface on the top of cover 104.

Sensor 100 also can include a sense element 106, and a package base 108. Sense element 106 can be implemented, for example, as a quartz sense element, a ceramic sense element, a silicon sense element and the like. A SAW chip, for example, can be utilized as sense element 106. Base 108 includes a base portion 120, which is recessed into base 108 and in which the sensor element or sense element 106 can rest.

Cover 104 can be formed from a stainless steel, such as, for example, a stainless steel 17-7 PH material. Cover 104 can be initially formed from a flat sheet stock that is approximately 0.50 mm thick in the annealed condition. The cover can next be stamped into a circular shape, and deep drawn into a cup configuration. Next, dimple 102 can be formed into the center of the diaphragm 103 portion of cover 104, such that dimple 102 is formed approximately 0.6 mm deep into cover 104. It can be of course be appreciated by those skilled in the art that such dimensions are discussed herein for illustrative purposes only, and are not considered limiting features of the present invention. The dimensions of cover 104 may vary, depending on the needs and use of such a device.

Base 108 can also be formed from a stainless steel such as a stainless steel 17-7 PH material. Stamping approximately 2 mm thick annealed material into a circular disk can form base 108. Such a disk can be formed so that two small saddles are protruding from base 108 for which the sensor chip (e.g., a sense element 106) will rest. Holes 116 and 118 can thus be punched into base 108 to facilitate glass to metal seals thereof. Hole 116 is associated with pin 112, while hole 118 is associated with pin 114. Pins 112 and 114 can be utilized to make electrical connection through the hermetic seal.

The glass to metal seal process and hardening process can occur simultaneously. The material can be heated to approximately 975 degree centigrade to re-flow the glass and for simultaneous "Austenite Conditioning" (a process well known in the art, which does not need to be described in detail herein) of 17-7 PH stainless steel used for base 108 and cover 104.

So-called "Austenite Conditioning" precipitates a significant amount of chromium carbide and prepares it for complete transformation to a hard martensitic plastic. Stainless steel type 17-7 PH can then be cooled to approximately –100 degree Fahrenheit and held 8 hours for complete transformation to a hard "Martensitic" phase for maximum strength and rigidity of the parts. In this condition, the parts are generally hard, but also brittle. The last process involves gold plating the pins 114 and 112 to facilitate wire bonding and soldering.

Finally, the sensor 100 can be assembled and tested. The sensor assembly sequence generally involves the following steps: die attach, wire bond, cover attach, pre-load, weld, after weld test, stabilization bake, after stabilization bake test, PCB attach and chamber test. Cover 104 and base 108 are thus designed to provide an interference fit so that the pre-load process and hermetic seal process can be controlled with increasingly accuracy and efficiency. The cover to base design of sensor 100 also removes assembly tolerances from the tolerance stack because it features a flange-less design.

Figure 2:
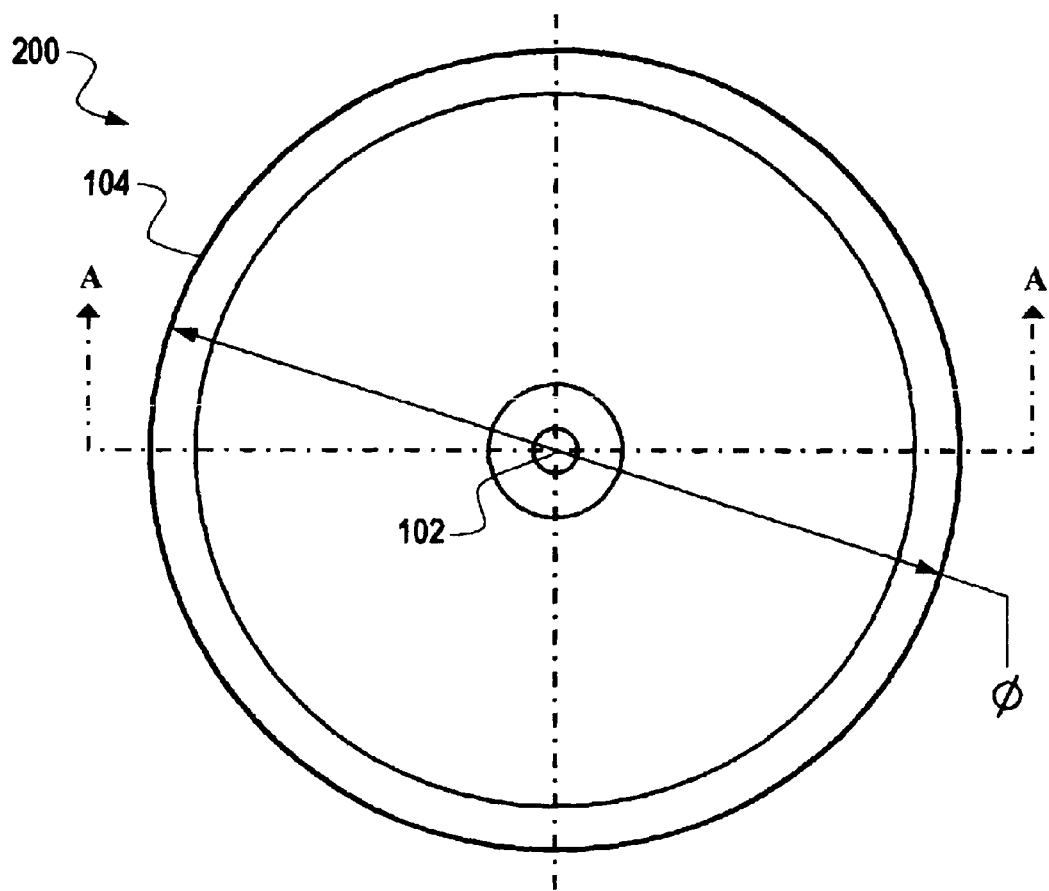
FIG. 2 illustrates a top view of a cover, which can be implemented in accordance with an embodiment of the present invention.
Figure 3:
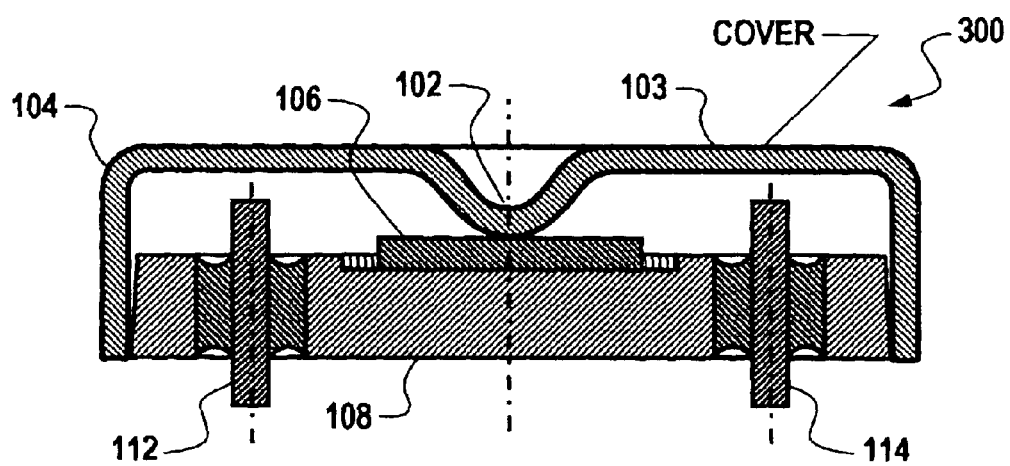
FIG. 3 illustrates a side sectional A—A view of cover depicted in FIG. 2, in which the cover is mounted over a base in accordance with an embodiment of the present invention.

FIG. 2 illustrates a top view 200 of cover 104, which can be implemented in accordance with an embodiment of the present invention. Note that in FIGS. 1, 2 and 3, like parts or elements are generally indicated by identical reference numerals. FIG. 3 illustrates a side sectional A—A view 300 of cover 104 depicted in FIG. 2, in which cover 104 is mounted over base 108, including pins 112 and 114, in accordance with an embodiment of the present invention. Cover 104 thus generally includes a dimple 102 formed at the center of the diaphragm 103 portion of cover 104. Sense element 106 is depicted in FIG. 3 as located below proximate to dimple 102 and between pins 112 and 114.

Figure 4:
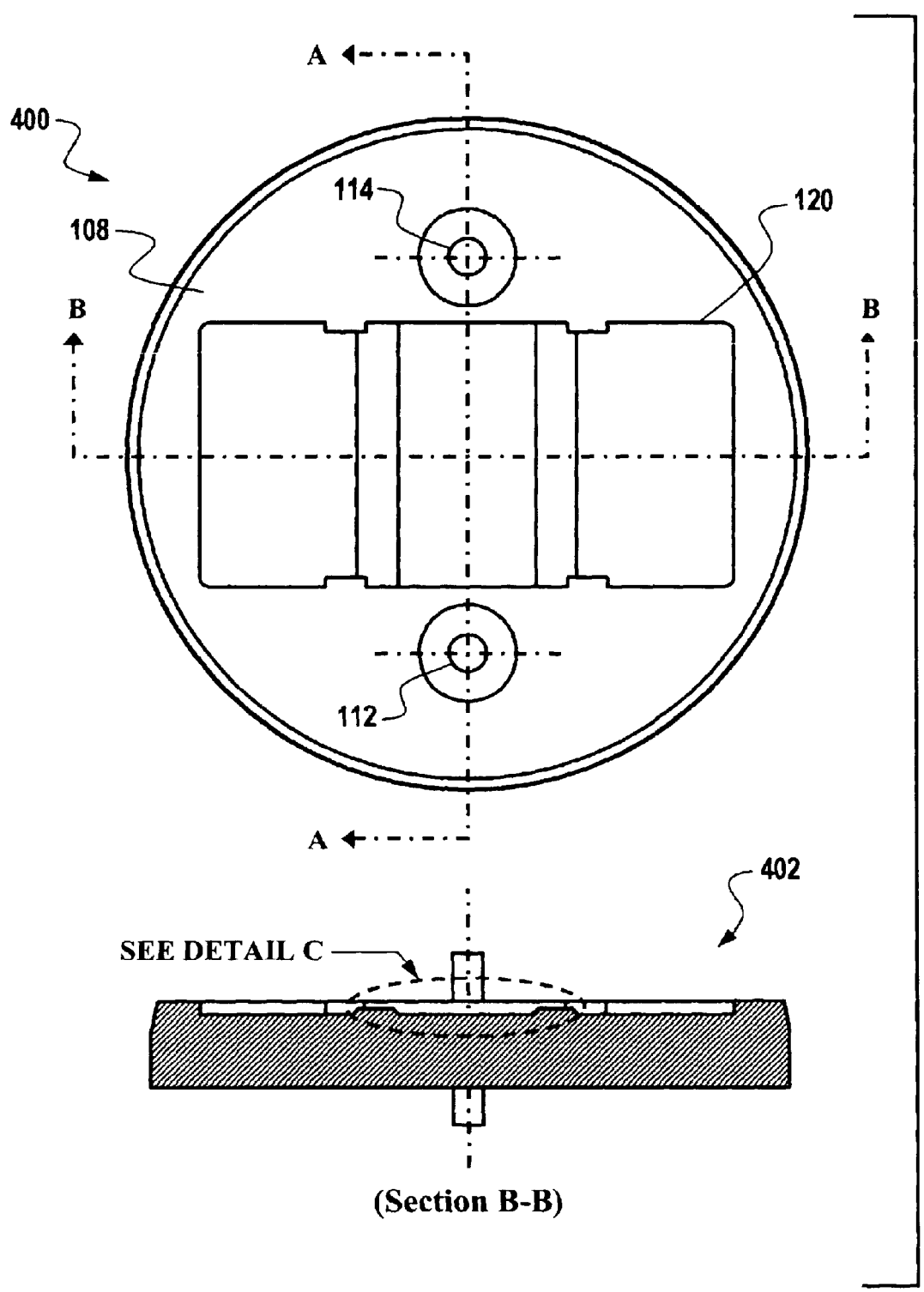
FIG. 4 illustrates top and side sectional views of a metal base, which can be implemented in accordance with an embodiment of the present invention.
Figure 5:
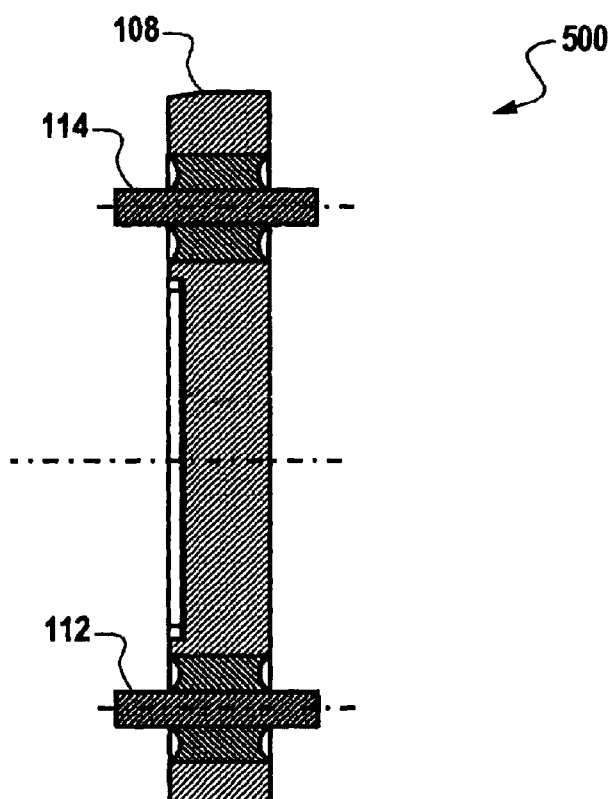
FIG. 5 illustrates a side sectional A—A view of the metal base depicted in FIG. 4, in accordance with an embodiment of the present invention.
Figure 6:
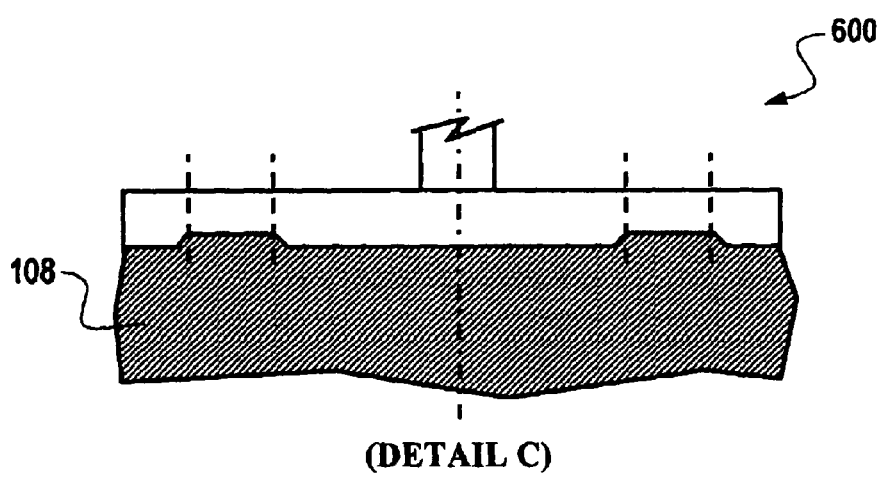
FIG. 6 illustrates a view of a detail C of the metal base depicted in FIG. 4, in accordance with an embodiment of the present invention; which can be implemented in accordance with an alternative embodiment of the present invention.

FIG. 4 illustrates respective top and side sectional views 400 and 402 of metal base 108, which can be implemented in accordance with an embodiment of the present invention. FIG. 5 illustrates a side sectional A—A view 500 of the metal base 108 depicted in FIG. 4, in accordance with an embodiment of the present invention. FIG. 6 illustrates a detail of view C 600 or the metal base 108 based depicted in FIG. 4 in accordance with an embodiment of the present invention. Note that in FIGS. 1 to 6 herein, like or analogous parts or elements are generally indicated by identical reference numerals.

Figure 7:
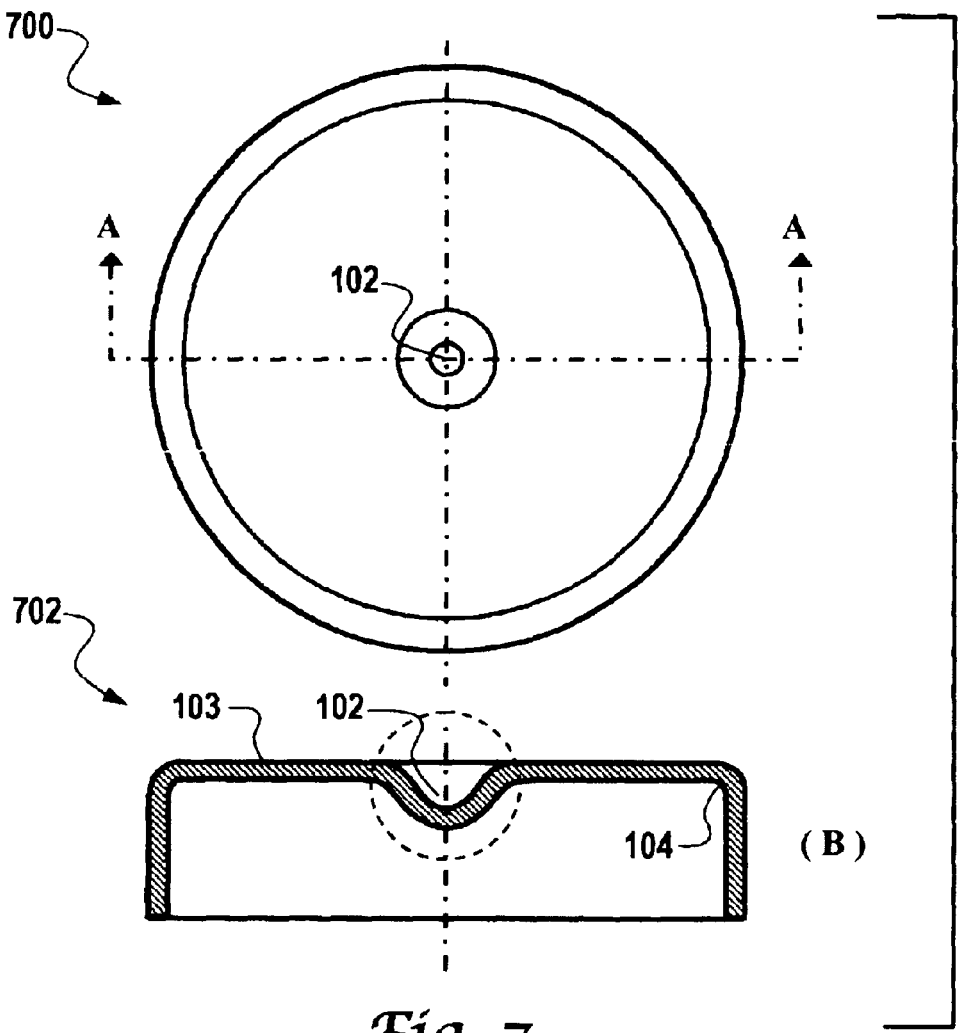
FIG. 7 illustrates top and side sectional views of a metal cover, which can be implemented in accordance with an alternative embodiment of the present invention.
Figure 8:
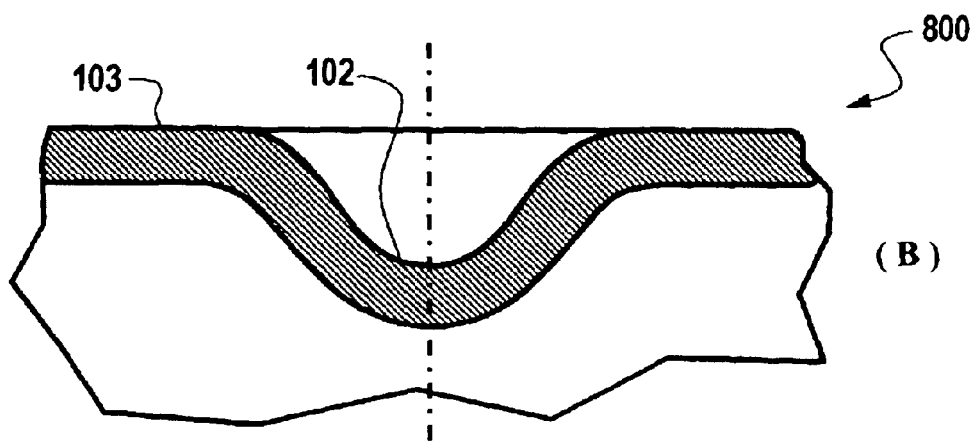
FIG. 8 illustrates a cut-away view of the metal cover depicted in FIG. 7, in accordance with an alternative embodiment of the present invention.

FIG. 7 illustrates top and side sectional views of cover 104, which can be implemented in accordance with an alternative embodiment of the present invention. FIG. 8 illustrates a cut-away view 800 of the dimple 102 depicted in FIG. 7, in accordance with an alternative embodiment of the present invention. Note that in FIGS. 1 to 8 illustrated herein, like or analogous parts or elements are generally indicated by identical reference numerals. Thus, FIG. 7 illustrates a top view 700 of cover 104, including dimple 102 located at the center the diaphragm 103 portion of cover 104. FIG. 7 also depicts a side sectional view 702 of cover 104, including the location of dimple 102 and diaphragm 103 of cover 104. The cut-away view 800 of cover 104 depicted in FIG. 8 provides a close-up view of dimple 102, and diaphragm 103 of cover 104.

The sensor described herein can be utilized to measure pressure and temperature inside a vehicle tire (e.g., a passenger car tire or truck tire). The sensor should preferably possess a low cross sectional area and thickness, and is generally light weight in configuration and compatible with processes used to mold truck tires and passenger car tires. The pressure sensor base and cover materials preferably have a low-yield strength (e.g., approximately 40,000 psi) in the annealed condition so that the sensor can be fabricated utilizing conventional processes such as machining and forming. The pressure sensor base and cover materials also have a high-yield strength (e.g., approximately 20,000 psi) in the hardened condition so that the sensor possesses an enhanced elastic range and lower deformation in the end application.

The use of a 17-7 PH material as the sensor material for the compatible with forming glass to metal seals in the base. The use of a 17-7 PH material for this sensor is an advantage of the present invention because the hardening process and the glass to metal sealing processes are combined. Another advantage of the present invention is that it provides enhanced sensor performance over other conventional pressures sensor designs.

Although not shown in FIGS. 1 to 8 herein, it can be appreciated that in a SAW pressure sensor embodiment, a plurality of resonators (e.g., 3 resonators) can be connected in parallel to an antenna positioned within a tire or any other device requiring pressure sensors. Such a SAW pressure sensor embodiment can be interrogated by a short RF pulse at a frequency of approximately 434 MHz, which can excite natural oscillations of the resonators. The oscillations can be re-radiated by the antenna and received by an interrogation unit. Such an interrogation unit can analyze the spectrum of the oscillators, calculate two different frequencies and find the pressure and the temperature of the tire.

Thus, a pressure sensor can be composed of a sense element on a base and pressure transducer sensor diaphragm that is part of the cover. For the sensor to function properly, the sensor diaphragm must be in intimate contact with the sense element at all pressure levels and temperatures. To compensate for expansion in the packaging, the sense element and sensor diaphragm must be preloaded when they are assembled to shift the output frequency a known amount, which ensures contact at all times.

In conventional sensor designs, an interference fit between the cover and base maintains preload until they are locked in place by welding, soldering or other connecting means. This type of interference fit can lessen before the parts are locked together and cause the preload to be reduced. The design depicted in FIG. 9 below ameliorates this problem.

Figure 9:
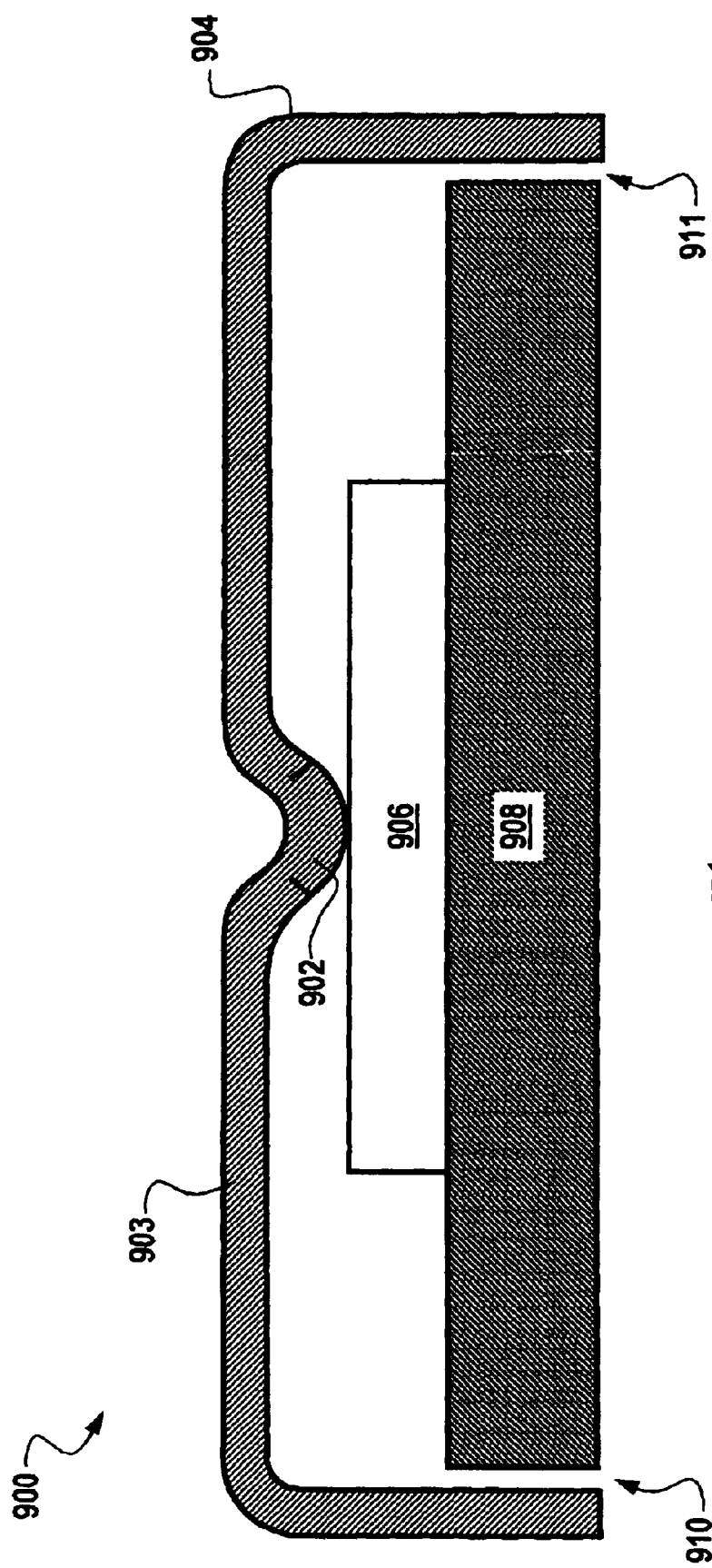
FIG. 9 illustrates a side sectional view of a sensor apparatus having a base, a cover and a clearance therebetween, which can be implemented in accordance with a preferred embodiment of the present invention.

FIG. 9 illustrates a side sectional view of a sensor apparatus 900 having a base 908, a cover 904 and a clearance 910 and 911 therebetween, which can be implemented in accordance with an alternative, but preferred embodiment of the present invention. Apparatus 900 is analogous to sensor 100 of FIG. 1 and the various components depicted in FIGS. 1 to 9, the difference being that apparatus 900 includes a clearance 910 and a clearance 911 between cover 904 and base 908. Cover 904 is analogous, for example, to cover 104 of FIG. 9. Base 908 is analogous to base 108 of FIG. 8. Clearances 910 and 911 thus respectively form gaps between cover 904 and base 908.

Apparatus 900 can thus be configured such that the base 908 is located proximate to cover 904. A sensor element 906 is located on the base 908 in a manner that permits clearances 910 and 911 to form between cover 904 and base 908. A sensor diaphragm 903 is incorporated into the cover 904. The cover 904 is located on the base 908 such that the dimple 902 is in intimate contact with the sensor element 910 at all pressure levels and temperatures thereof.

Cover 904 additionally can be configured to include a dimple 902, which is generally analogous to the dimple 102 illustrated in FIG. 1. Note that the particular shape and size of dimple 902 may vary, depending on particular applications. The dimple 902 depicted in FIG. 9 is thus presented for illustrative purposes only and the size and shape thereof are not considered limiting features of the present invention.

It can be appreciated from FIG. 9, that instead of using an interference fit between the cover and base, the components thereof can be designed to form a clearance or gap between the cover and base. Such a design does not rely on an interference between the two parts to maintain preload, but instead can utilize welding, soldering or other connecting means to lock the components in position at the time the cover is assembled to the base.

The components can be designed such that even if the cover is at its smallest inside dimension within the tolerance range and the base is at its largest outside dimension within the tolerance range there will be clearance between them when they are assembled together. Thus, a clearance should exist generally between the cover and base even if the cover is at its smallest dimension within the tolerance range and the base is at its largest dimension within the tolerance range. The intent of such a feature is to produce the parts at their nominal dimension.

Figure 10:
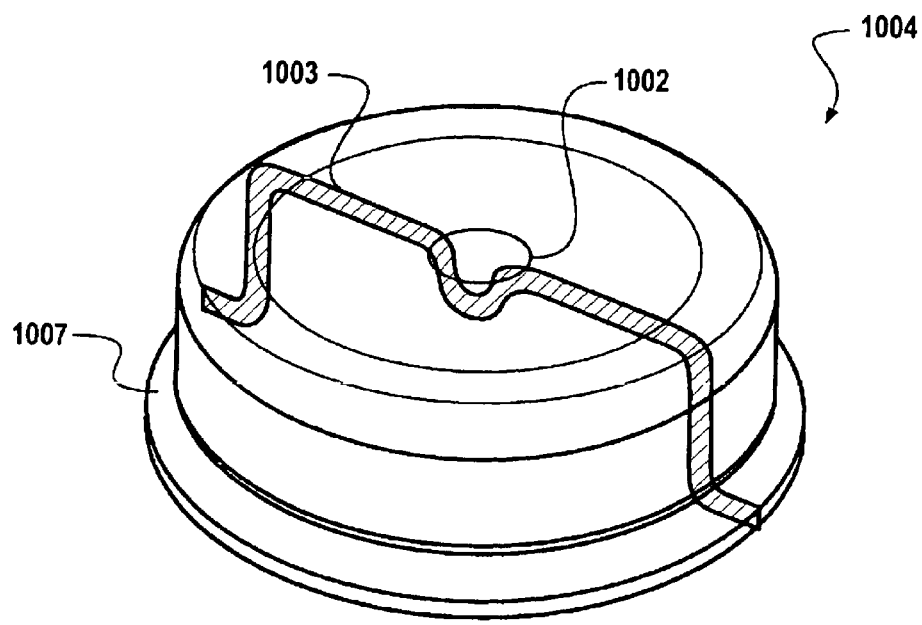
FIG. 10 illustrates a top view of a "top hat" cover, which can be implemented in accordance with a preferred embodiment of the present invention.
Figure 11:
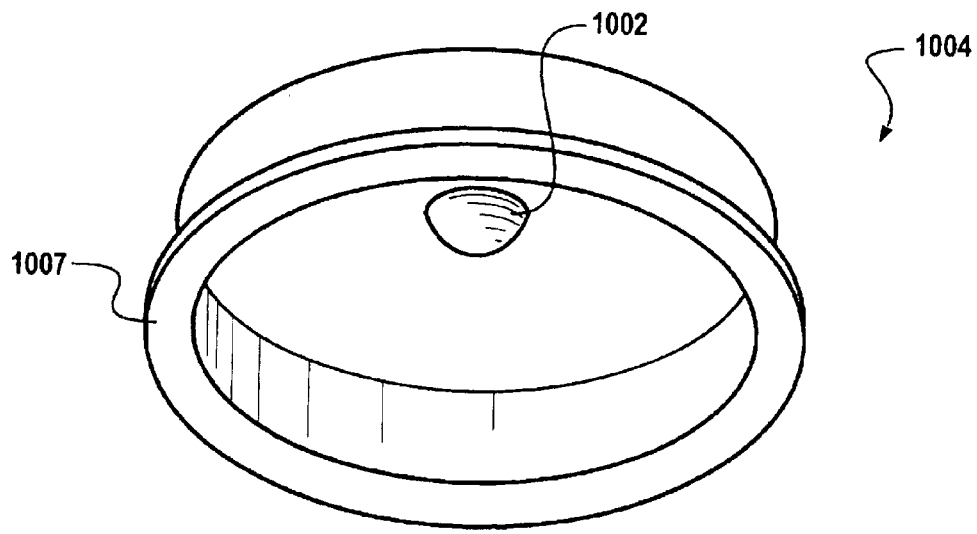
FIG. 11 illustrates a bottom view of the "top hat" cover depicted in FIG. 10.

FIG. 10 illustrates a top view of a "top hat" cover 1004, which can be implemented in accordance with a preferred embodiment of the present invention. FIG. 11 illustrates a bottom view of the "top hat" cover 1004 depicted in FIG. 10. Note that in FIGS. 10 and 11, like or identical parts are indicated by identical reference numerals. It can be appreciated that the package cover 104 described above can be modified in order to prevent errors that can occur as a result errors induced by a fixture to which the sensor is attached. Thus, package cover 104 can be configured as cover 1004 of FIGS. 10 and 11 and can be implemented in place of cover 104. A sensor diaphragm 1003 is a part of the cover 1004. A flanged area 1007 is generally formed to the bottom portion of the cover 1004 when the cover is produced. The flanged portion or flanged area 1007 provides a surface for contacting a fixture to which the sensor apparatus can attach and also serves to hold the sensor apparatus to such a fixture in a manner that can prevent the sensor diaphragm 1003 from contacting the fixture and inducing errors during sensor operations thereof.

The flanged area or flanged portion 1007 can be positioned parallel to the sensor diaphragm 1003. Material can be formed to the bottom of cover 1004 that is thus parallel to the sensor diaphragm 1003 (e.g., sensor diaphragm 103 of FIG. 1). Such material can extend outward a sufficient amount for the fixture to grab onto. This added material thus resembles the brim of a "top hat" thereby forming flanged portion 1007 of cover 1004. By utilizing this added material to grab onto and press against when fixing the sensor to a desired location (e.g., for tire pressure sensing) instead of the sensor diaphragm (which is the case with the configuration depicted in FIG. 1), no unwanted force is transmitted to the sense element (e.g., sense element 106 of FIG. 1).

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A sensor apparatus, comprising:
   a sensor element located on a base;
   a cover located proximate to said base, wherein said cover comprises a sensor diaphragm and an inward dimple that is formed into and a part of said cover and wherein said inward dimple is formed from and incorporated into said cover; and
   a flanged area formed to a bottom portion of said cover, wherein said flanged area is connected to and surrounds said bottom portion of said cover and is further positioned parallel to said sensor diaphragm, such that said flanged area provides a surface for contacting a fixture to which said sensor apparatus attaches and holding said sensor apparatus to said fixture in a manner which prevents said sensor diaphragm from contacting said fixture and inducing errors during sensor operations thereof.

2. The apparatus of claim 1 wherein said cover comprises a pressure transducer sensor diaphragm.

3. The apparatus of claim 1 wherein said sensor element comprises quartz.

4. The apparatus of claim 1 wherein said sensor element comprises ceramic.

5. The apparatus of claim 1 wherein said sensor element comprises silicon.

6. The apparatus of claim 1 wherein said sensor apparatus comprises a pressure sensor.

7. The apparatus of claim 1 wherein said sensor apparatus comprises a surface acoustic wave (SAW) pressure sensor.

8. A pressure sensor apparatus, comprising:
   a sensor element located on a base, wherein said sensor element comprises at least one of the following materials: ceramic, silicon and quartz;
   a cover located proximate to said base, wherein said cover comprises a pressure transducer sensor diaphragm and an inward dimple that is formed into and a part of said cover, wherein said dimple is formed from and incorporated into said cover; and
   a flanged area formed to a bottom portion of said cover, wherein said flanged area is connected to and surrounds said bottom portion of said cover and is positioned parallel to said sensor diaphragm, and such that said flanged area provides a surface for contacting a fixture to which said sensor apparatus attaches and holding said sensor apparatus to said fixture in a manner which prevents said sensor diaphragm from contacting said fixture and inducing errors during sensor operations thereof, wherein said sensor apparatus comprises a surface acoustic wave (SAW) pressure sensor.

9. A sensor method, comprising the steps of:
   locating a sensor element on a base;
   positioning a cover proximate to said base, wherein said cover comprises a sensor diaphragm and an inward dimple that is formed into and a part of said cover, wherein said inward dimple is formed from and incorporated into said cover;

forming a flanged area at a bottom portion of said cover; and connecting said flanged area to said bottom portion of said cover, wherein said flanged area provides a surface for contacting a fixture to which said sensor apparatus attaches and holding said sensor apparatus to said fixture in a manner which prevents said sensor diaphragm from contacting said fixture and inducing errors during sensor operations thereof.

10. The method of claim 9 further comprising the steps of:

surrounding said bottom portion of said cover with said flanged area; and positioning said flanged area parallel to said sensor diaphragm.

11. The method of claim 9 further comprising the step of:

configuring said cover to comprise a pressure transducer sensor diaphragm.

12. The method of claim 9 wherein said sensor element comprises quartz.

13. The method of claim 9 wherein said sensor element comprises ceramic.

14. The method of claim 9 wherein said sensor element comprises silicon.

15. The method of claim 9 wherein said sensor apparatus comprises a pressure sensor.

16. The method of claim 9 wherein said sensor apparatus comprises a surface acoustic wave (SAW) pressure sensor.

* * * * *